United States Patent

[11] 3,600,985

| | | |
|---|---|---|
| [72] | Inventor | Lucien W. Carignan<br>East Providence, R.I. |
| [21] | Appl. No. | 766,595 |
| [22] | Filed | Oct. 10, 1968 |
| [45] | Patented | Aug. 24, 1971 |
| [73] | Assignee | New England Malleable Iron Company |

[54] APPARATUS FOR MACHINING A PLURALITY OF LIKE ARTICLES SIMULTANEOUSLY
4 Claims, 8 Drawing Figs.

[52] U.S. Cl. .................................................. 82/3, 82/2.5
[51] Int. Cl. ................................................. B23b 3/34
[50] Field of Search .......................... 82/2.5, 2.7, 3, 101; 74/220; 29/240

[56] References Cited
UNITED STATES PATENTS

| | | | |
|---|---|---|---|
| 2,595,522 | 5/1952 | Harney | 82/2.7 |
| 3,292,468 | 12/1966 | Orthey | 82/101 |
| 3,264,910 | 8/1966 | Kindelan | 82/3 |

Primary Examiner—Andrew R. Juhasz
Assistant Examiner—Leon Gilden
Attorney—Barlow and Barlow ABSTRACT: A finishing machine for the male section of a pipe union in which a plurality of threaded spindles are manually loaded with a threaded pipe union section and then the sequential operations of cross slide and end slide machine the section, stop the rotation of the workpiece and reverse the spindles to unthread the workpiece from the spindles and whereupon they fall into a chute and are conveyed into a tote box, all automatically with no manual labor after the loading of the spindles with the work.

PATENTED AUG 24 1971

INVENTOR
LUCIEN W. CARIGNAN

BY
Barlow & Barlow
ATTORNEYS

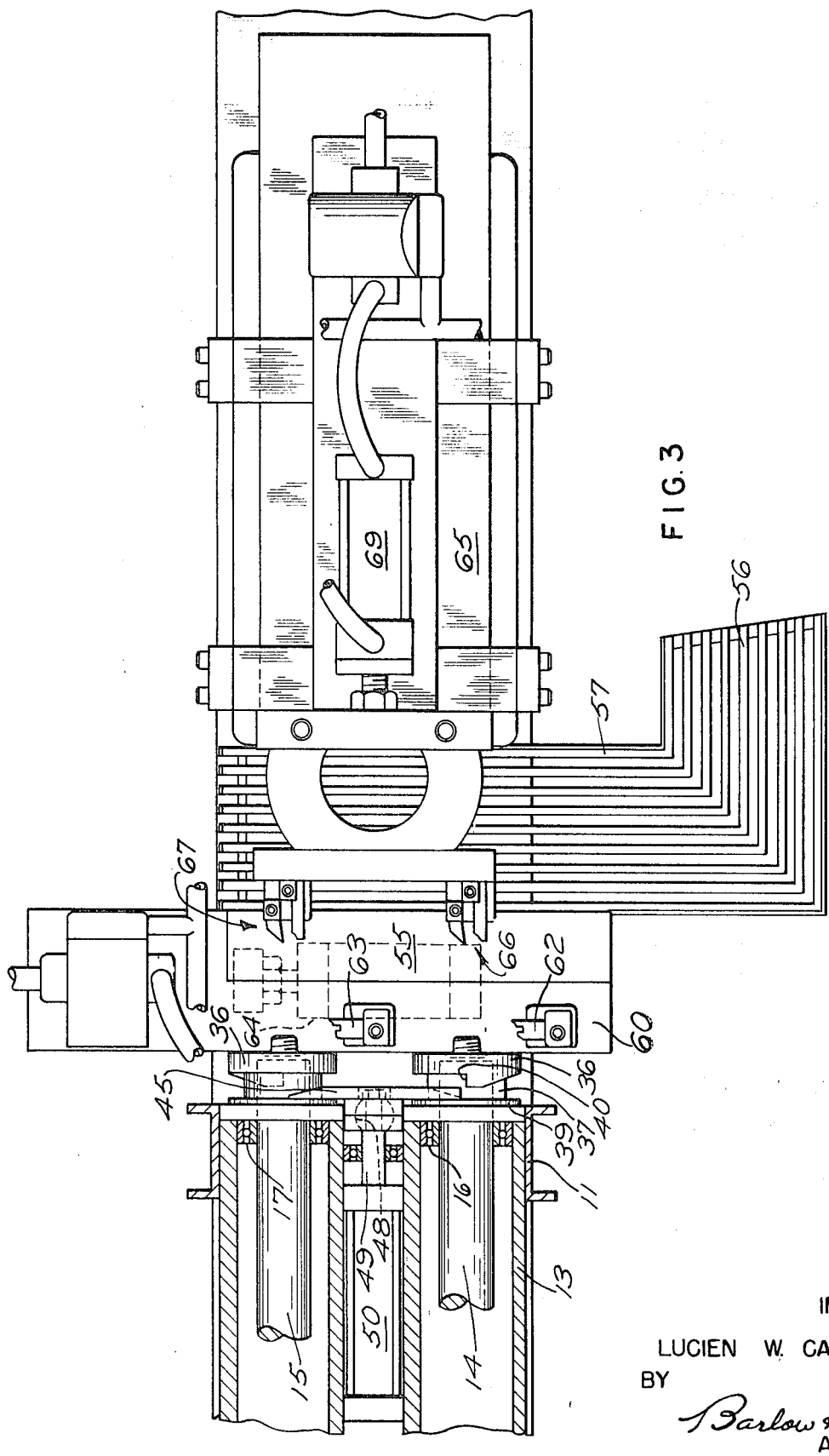

INVENTOR
LUCIEN W. CARIGNAN

APPARATUS FOR MACHINING A PLURALITY OF LIKE ARTICLES SIMULTANEOUSLY

BACKGROUND OF THE INVENTION

Heretofore, the male sections of a pipe union were manually loaded on rotating spindles and then cross and end slides were manually advanced and retracted for machining the work, and a further manual operation was performed to initiate reversal of the spindles and discharge the work from the spindles.

SUMMARY OF THE INVENTION

A plurality of rotating spindles (in this case two) are driven in one direction of rotation, the spindles being threaded so that the threaded male section of a pipe union may be manually engaged with these threads, after which cross and end operating slides move in to machine the work followed by stopping of the work and reversing of the rotation of the spindles to discharge the work from the spindles, all mechanically done automatically in a sequential operation, leaving the machine to be again manually loaded. The spindles are driven in one direction or the other direction by the same belt from a motor continuously driven in one direction by utilization of clutch means and the driving of the spindles from one side or the opposite side of a driving belt.

BRIEF DESCRIPTION OF THE DRAWINGS

FIG. 3 is a sectional view just above the spindles upon which the work is mounted;

DESCRIPTION OF THE PREFERRED EMBODIMENT

Figure 1:
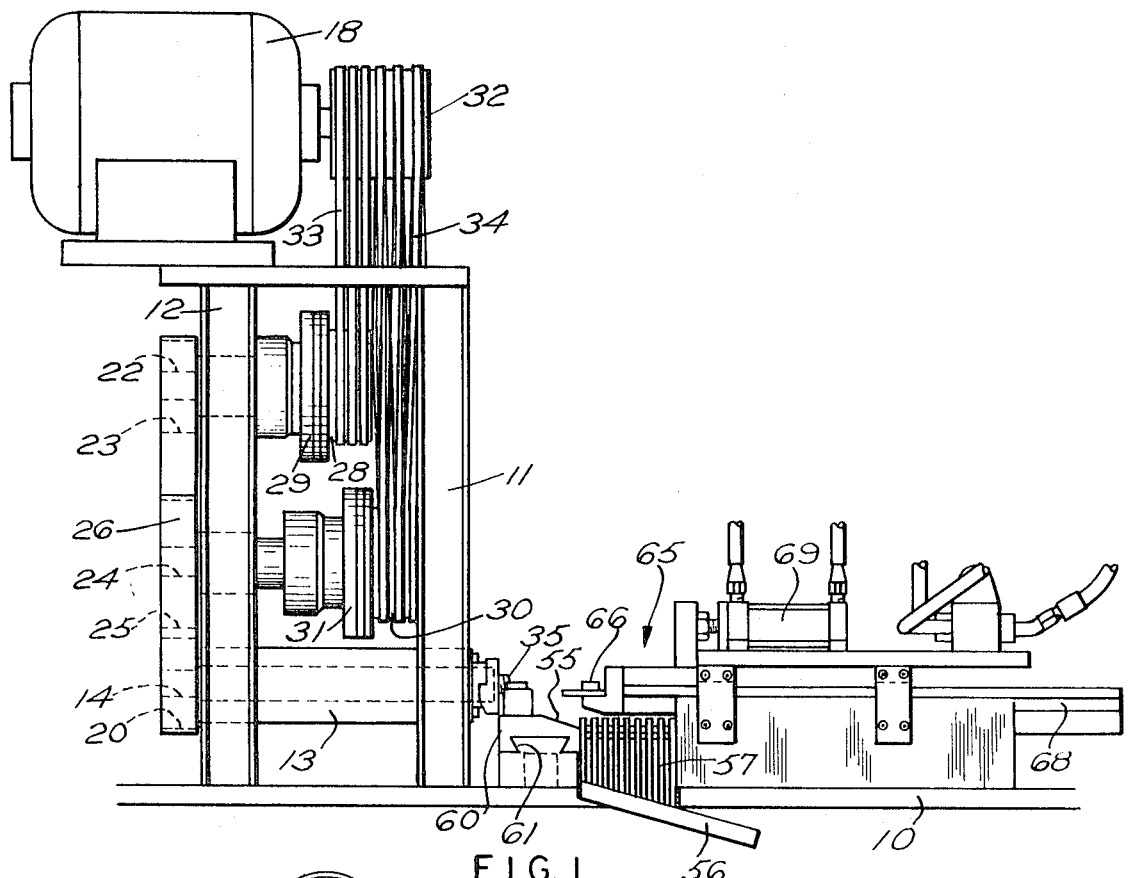
FIG. 1 is an elevation of certain essential parts of the apparatus of this invention.
Figure 2:
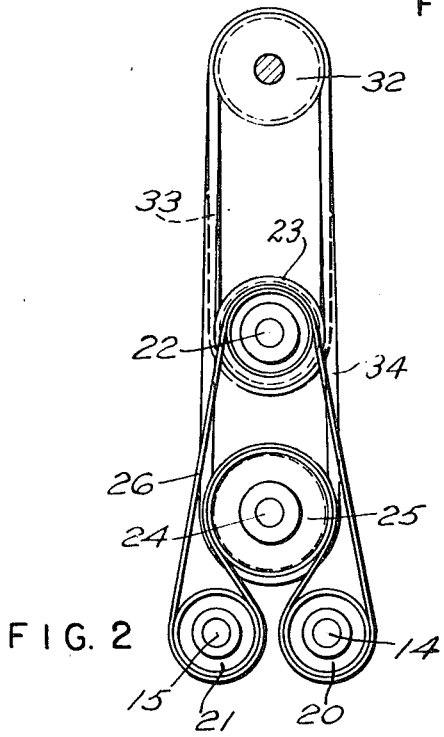
FIG. 2 is an end view of the drive for the spindles of the apparatus.
Figure 8:
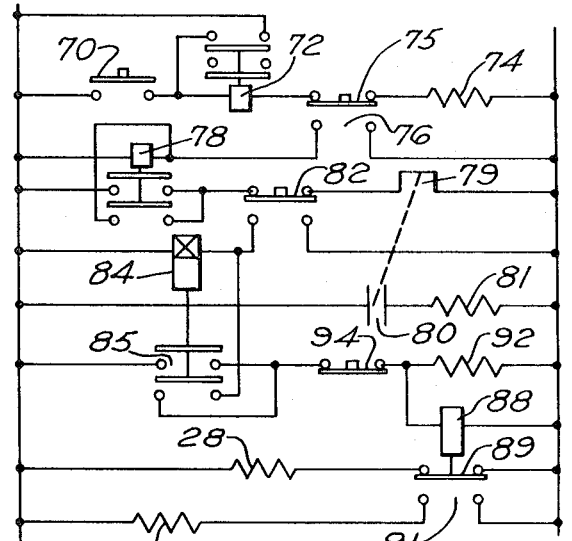
FIG. 8 is a simplified electrical schematic of the control for the machine illustrating the sequential operation of the parts involved.

With reference to the drawings, 10 designates the bed of the apparatus or machine upon which is mounted a pair of uprights 11 and 12 tied together with horizontals 13 which is a part of the framework which provides mountings for the spindles 14 and 15 located in substantially a horizontal plane and which rotate in the ball bearings 16 and 17 (see FIG. 3) receiving their drive from a motor 18 as more clearly shown in FIG. 1. The spindle 14 is equipped with a pulley 20 and the spindle 15 with a pulley 21. Countershaft 22 is equipped with a pulley 23 and countershaft 24 is equipped with a pulley 25. An endless belt 26 extends from the pulley 23 about pulley 20, then over pulley 25 and then about pulley 21 and back to pulley 23 as seen in FIG. 2, thus causing the spindles 14, 14 15 countershaft 22 to rotate in one direction, while the countershaft 24 rotates in the opposite direction. The countershaft 22 is equipped with a pulley 28 having a plurality of V-shaped grooves therein and is connected to the countershaft 22 through a clutch 29. Countershaft 24 is equipped with a pulley 30 which is connected to the countershaft 24 through a clutch 31. A pulley 32 on the armature shaft of the motor 18 drives the pulley 28 through a plurality of V-belts 33 while the same pulley 32 drives the pulley 30 through a plurality of V-belts 34 so that the pulley 30 is rotating in the same direction of rotation as the pulley 28, although in the opposite direction from the pulley 25 when driven by belts 33, 26.

If it is desired to drive the spindles 14 and 15 in one direction, for example, a clockwise direction as viewed in FIG. 2, clutch 29 will engage pulley 28 so as to drive the countershaft 22 and the pulleys 14 and 15 in the clockwise direction. If, however, it is desired to drive the spindles 14 and 15 in the reverse direction, then clutch 29 is thrown out and clutch 31 is thrown in and then belts 34 will drive through the pulleys 30, 25, the belt 26 and spindles 14 and 15 in the reverse direction. It will be noted that the belt 26 engages the pulleys 23, 20 and 21 on one side of its surface whereas the belt engages the pulley 25 on the reverse side of its surface. This provides a simple arrangement for maintaining accurate timing relation and also the reduction of mechanisms and a positive drive is provided in both directions. The belt 26 may be a gear belt if desired.

Figures 4, 5:
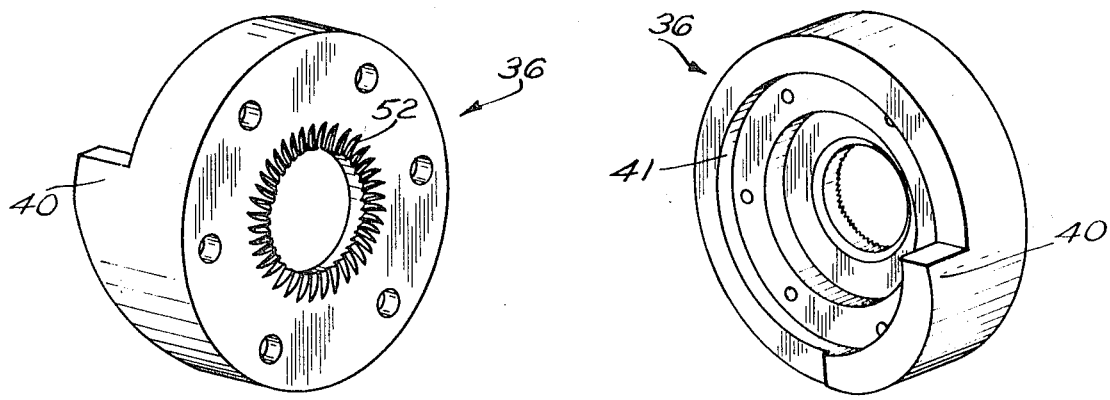
FIG. 4 is a perspective view of the face of one of the disks which engage the work.
FIG. 5 is a perspective view of the rear thereof.
Figure 6:
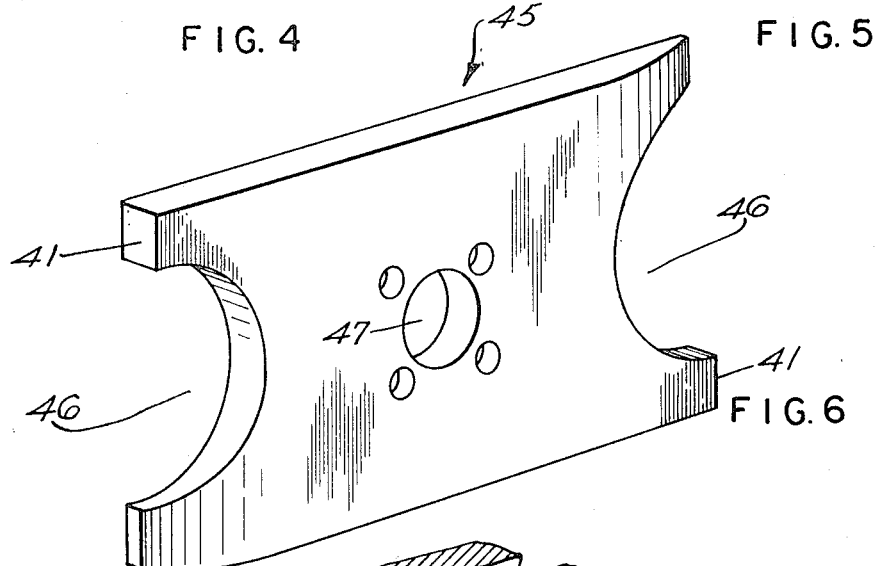
FIG. 6 is a perspective view of the plate which is used for discharging the work in cooperation with the disks.

The spindles 14 and 15 are substantially duplicates, and each is reduced as at 35 and threaded for the reception of the threaded portion of the male section of a pipe union. A disk 36 (see FIGS. 4 and 5) is secured to a collar 37 by screws 38 which in turn is secured to a rim 39 which, as an assembled unit of face plate 36, collar 37 and rim 39, is freely rotatable upon the spindle 14 or 15. A ratchet dog 40 is formed on the back of the disk 36 just radially outwardly of the collar 37. An actuating plate designated generally 45, has arcuate portions 46 on either side thereof terminating with abutments 41 to partially embrace the collar 37. The thickness of the plate is such as to extend between the ring 39 and the disk 36 clear of the dog 40 when in retracted position. This plate extends laterally between the two disks and their collars and receives the collar of spindle 14 in one arcuate recess, while it receives the collar of the spindle 15 in the other arcuate recess. An opening 47 provides for mounting this plate 45 on a swivel ball joint 48 (FIG. 3) which is on the end of a plunger 49 actuated by a fluid cylinder 50 which may force the plunger 49 forwardly or to the right as shown in FIGS. 1 and 3 so as to move the plate 45 into the rotational path of the dog 40 so that the dog 40 will engage the abutment 41, thereby arresting the movement of the disk 36, collar 37, ring 39 and at the same time urging the work toward the one end of the spindle. The arresting of the rotation of the disk occurs at a time when the spindles are given a reverse rotation and the serrated surface 52 on the disks which engage the work or article being operated upon hold the article against rotation as the spindles are given a reverse rotation or counterclockwise rotation and at the same time that they are urged to the free end of the spindle, thereby causing the threaded workpiece to be discharged from the threaded spindle to fall onto an incline 55, thence into the bar-type chute 56, 57 and into a tote box.

In order to machine the work, a cross-slide 60 is mounted on the dovetail guideway 61 which slide carries tools 62 and 63, one for operating upon each workpiece on the spindles 14 and 15. This cross-slide is moved to and from working position by a fluid cylinder 64 beneath the cross-slide which is actuated under suitable controls. An end slide designated generally 65 carries tools 66 and 67, one for each of the pieces of work being operated upon and may be moved in suitable guideway 68 by a fluid cylinder 69 under suitable controls for moving the tools 66 and 67 to and from engagement with the work on the ends of the spindles. For a better understanding of the machine, the operation will now be described.

Figure 7:
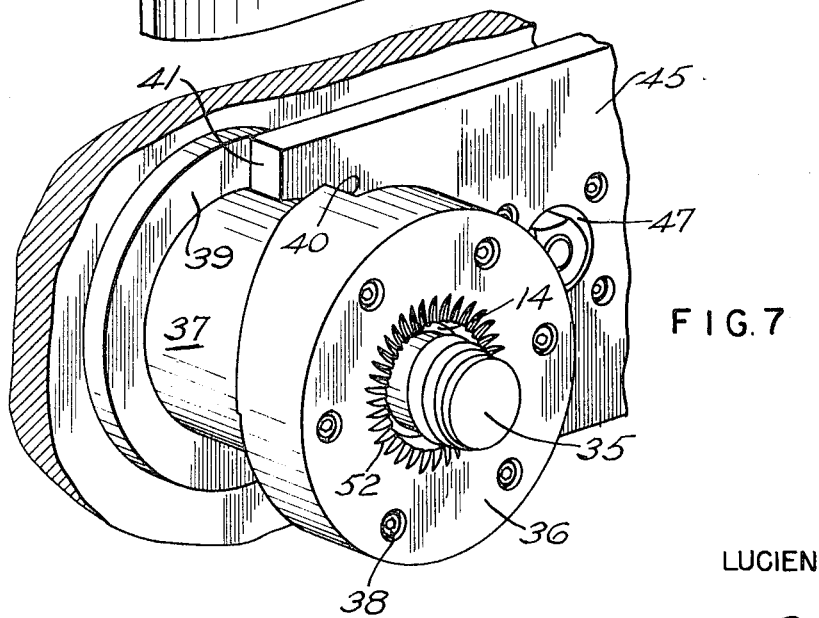
FIG. 7 is a perspective view of the disk and plate relation.

Assuming the spindles 14 and 15 to be rotating in a clockwise direction as driven from the motor 18, an operator will pick up the prethreaded male parts of a pipe union and place them on the rotating threaded arbors. Practically instantaneously the parts are forced against the serrated face of the ratchet disks which are also rotating clockwise by reason of their frictional contact with arbors. When the machine is loaded in this manner, the operator hits the "START" button or momentary switch 70. This actuates relay 72 which continues to complete a circuit to an electric solenoid valve 74 that operates and causes the fluid cylinder 64 to move the cross-slide 60 to machine the work. At the end of its preset stroke, cross-slide 60 engages a limit switch 75 that disengages the current to the four-way solenoid valve 74 and releases relay 72 thereby causing the cross-slide to be urged back to its starting position as the four-way solenoid valve has been reversed in its porting. At the same time the limit switch 75 engages the back contacts 76 which actuates a relay 78 which closes a circuit to a thermodelay relay coil 79 which has sufficient delay to permit the cross-slide 60 to get out of the way and then will close its contactor 80 thereby closing a circuit to four-way valve solenoid 81 that will change the hydraulic circuit to fluid cylinder 69 and start the end slide 65 moving in to perform another machining operation on the work. At the end of the inner travel of the end slide 65 limit switch 82 breaks the connection to relays 78 and 79, opening contactor 80 and changing the position of the four-way valve controlled by the coil 81 after a preset delay that allows a burnishing operation to take place. At the same time a circuit is completed to a slow operate type relay 84, which closes on a similar delay as the dwell of operating coil 79, closing its contacts 85 and completing a circuit to relay 88. Relay 88 has a contactor 89 that normally completes a circuit through the clutch 28 but since it is energized, its contacts 91 are closed operating the clutch 31, thereby reversing the rotation of the arbors 14 and 15. At the same time that this reverse rotation is accomplished, the solenoid 92 of a four-way hydraulic valve is energized to cause the fluid power means 50 to force the spindle 49 on its plate 45 to the right as shown in FIGS. 1 and 3 so that the plate and particularly its abutment 41 will engage the dog 40 of the disks stopping their rotation with the work snugly against the serrated surface of the disks. The plate urges the disks toward the free spindle end and with the counterclockwise rotation of the spindles, the work which is held while the spindles are rotating counter clockwise, as viewed in FIG. 7, for example, will be discharged by the forcing of the disks toward the end of the spindles. At the end of the forward travel of the plate 45, a portion of the mechanical means attached thereto will engage a limit switch 94, that will open the relay 84, reverse the travel of the plate 45 by deenergization of the hydraulic solenoid 92, and change the rotation of the spindles by reclosing the contacts 89. As the plate 45 returns to its starting position, it draws the disks with it by reason of the arcuate portion of the plate engaging the ring 39 attached to the collar 37 and at the same time, of course, it will free the disks and collars from the dog 40. The machine has now returned to its initial position and may be reloaded manually by holding a male section of a pipe unit adjacent the spindle 35 whereupon it will be grabbed and threaded thereupon. Also it will be noted that all of the electrical controls have returned to normal position and in order to start the sequence again the start button 70 must be pressed. It will also be noted in the above description that the relay 72, 78 and 84 are of the holding type since they are initially actuated by momentary limit switches such as 75, 82 and have been so diagrammed in the electrical schematic.

I claim:

1. In an apparatus for machining a plurality of articles simultaneously, a plurality of spindles, one for mounting each article, a cross-slide for reciprocating in a path at right angles to the axis of said spindles, a tool for each article mounted on said cross-slide, a second slide movable in a path axially of said spindles, a tool for each article mounted on said second slide, means for moving the slides to engage the tools carried thereby with the work and retract the tools therefrom, means to drive the spindles in one direction during the operation of said tools and in an opposite direction upon completion of the operation of said tools, and means to operate said means in sequence, said last said means including means resulting in the discharge of the articles from said spindles, said spindle drive means comprising a pulley on each spindle and a pair of intermediate pulleys, a belt trained over said pulleys with one side engaging one intermediate pulley and said spindle pulleys and the other side engaging the other intermediate pulley whereby said intermediate pulleys rotate in opposite directions and clutch controlled means to drive said belt thru either related intermediate pulleys to rotate said spindles in one direction or the reverse direction.

2. In an apparatus for machining a plurality of articles simultaneously, a plurality of spindles, one for mounting each article, said spindles being threaded for mounting the work thereon, means for rotating said spindles in one direction and then reversing the direction of rotation, a disk on each spindle against which the work article engages a ratchet dog on said disk, a plate engageable with said ratchet dogs, means operable upon said direction reverse to move said plate toward said work article to engage said dogs and stop said disks and work article engaged by said disks to cause the article engaging said disks to be discharged by the reverse rotating threaded spindles.

3. In an apparatus for machining a plurality of articles simultaneously as in claim 2 wherein the surface of said disks engaging the work article has a serrated face.

4. In an apparatus for machining a plurality of articles simultaneously as in claim 2, said rotating means comprising a pulley on each spindle and a pair of intermediate pulleys, a belt trained over said pulleys with one side engaging one intermediate pulley and said spindle pulleys and the other side engaging the other intermediate pulley whereby said intermediate pulleys rotate in opposite directions and clutch controlled means to drive said belt thru either related intermediate pulleys to rotate said spindles in one direction or the reverse direction.